United States Patent
Kumarasamy et al.

(10) Patent No.: US 9,639,788 B2
(45) Date of Patent: May 2, 2017

(54) RASTER IMAGE PROCESSOR METHODS AND SYSTEMS

(71) Applicant: Xerox Corporation, Norwalk, CT (US)

(72) Inventors: Prakash Kumarasamy, Tamil Nadu (IN); Sankaralingam Madasamy, Tamil Nadu (IN); Apurba Das, West Bengal (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/812,036

(22) Filed: Jul. 29, 2015

(65) Prior Publication Data

US 2017/0032226 A1    Feb. 2, 2017

(51) Int. Cl.
*G06F 3/12* (2006.01)
*G06K 15/02* (2006.01)

(52) U.S. Cl.
CPC ..... *G06K 15/1836* (2013.01); *G06K 15/1813* (2013.01); *G06K 15/1865* (2013.01)

(58) Field of Classification Search
CPC combination set(s) only.
See application file for complete search history.

(56) References Cited

U.S. PATENT DOCUMENTS

| | | | |
|---|---|---|---|
| 5,619,594 A | 4/1997 | Melen | |
| 6,289,364 B1 | 9/2001 | Borg et al. | |
| 6,996,284 B2 | 2/2006 | Earl et al. | |
| 7,307,760 B2 | 12/2007 | Jacobs et al. | |
| 7,433,103 B2 | 10/2008 | Edge | |
| 7,880,750 B2 | 2/2011 | Romney | |
| 7,978,196 B2 | 7/2011 | Combes et al. | |
| 8,654,147 B2 | 2/2014 | Hitosugi | |
| 8,767,252 B2 * | 7/2014 | Schlachter | H04N 1/3871 358/1.16 |
| 8,780,373 B2 | 7/2014 | Rivadeneira | |
| 8,854,688 B2 | 10/2014 | Abel et al. | |
| 8,855,438 B2 | 10/2014 | Hitosugi | |
| 2006/0146362 A1 * | 7/2006 | Romney | G06F 3/1206 358/1.15 |
| 2006/0228044 A1 * | 10/2006 | Yeh | H04N 1/3878 382/276 |
| 2007/0206012 A1 * | 9/2007 | Combes | G06T 11/20 345/441 |
| 2009/0244641 A1 * | 10/2009 | Wu | G03G 21/043 358/3.28 |
| 2011/0128589 A1 * | 6/2011 | Hasegawa | H04N 1/3877 358/451 |

(Continued)

*Primary Examiner* — Henok A Shiferaw
(74) *Attorney, Agent, or Firm* — Kermit D. Lopez; Luis M. Ortiz; Ortiz & Lopez, PLLC (57) ABSTRACT

Methods, systems, and computer program products for improving the performance of a raster image processor. Smaller objects are identified among a group of larger objects with respect to a job processed via a raster image processor. The smaller objects are merged with one or more larger objects among the group of larger objects. The smaller objects that are merged with the larger object are treated as a single object without losing the perceptual quality of the job and while reducing memory requirements to thereby enhance productivity during processing of the job via the raster image processor. RIP performance improvement results by pre-flattening complicatedly designed backgrounds with multiple objects of significantly low relative occupancy.

14 Claims, 7 Drawing Sheets

(56) References Cited

U.S. PATENT DOCUMENTS

2011/0216086 A1*  9/2011  Hitosugi .................. G09G 5/00
                                                     345/629
2012/0288211 A1*  11/2012  Hitosugi ................... G06T 9/00
                                                     382/244

* cited by examiner

RASTER IMAGE PROCESSOR METHODS AND SYSTEMS

TECHNICAL FIELD

Embodiments are generally related to the field of digital imaging. Embodiments also relate to RIP (Raster Image Processor) devices, systems, and methods. Embodiments additionally relate to systems and methods for improving RIP performance by pre-flattening complicatedly designed backgrounds with multiple objects of significantly low relative occupancy.

BACKGROUND OF THE INVENTION

A Raster Image Processor (RIP) is a component that can be found in some printers. An RIP receives data in a description language, such as, for example, Postscript, PCL, or PDF and converts such data to a bitmap or raster image. Raster image processing can be accomplished in two ways: as software running as part of an operating system or as a special microprocessor within the printer. Inexpensive printers often utilize a solution referred to as host-based printing, which is implemented in the operating system. More expensive printers, and those that support PCL, Postscript or a similar language typically include an actual raster image processor chip inside the printer.

During the development of documents, it is common for a designer to design a document having background images or graphics along with small tiny noise-like vector objects (e.g., filled or stroke) that are scattered across the complete page or a portion of the page in order to create the perception of a spray effect on the designed background. Such a design, however, presents a challenge when raster image processing the background.

The RIP system is concerned with the quality of the rendered document. During the RIP process, different kinds of objects may be assigned to different tags and compressed differently. The associated tag switching creates a ghosting effect and additionally, the switching of compression methodology impacts the RIP performance in a negative manner.

Considering image backgrounds and 1-pixel or 2-pixel tine graphic noise, the lossy (e.g., JPEG) and lossless (e.g., RLE) compression switching significantly reduces the printing speed. In this example, from a perceptual quality perspective, the entire image along with the tiny vectors form a background, but the imager does not understand this and collects, flattens, and compresses each object separately.

In conventional RIP systems, the aforementioned tiny objects are considered as individual objects during a flattening operation, resulting in increased memory requirements and an increase in flattening time due to iterative flattening. An iterative flattening operation is then initiated, if the pre-allocated memory is being used for collecting the objects (e.g., the job has more number of objects in page). The memory is then exhausted. During iterative flattening, the collected objects are flattened in batch wise and then dumped to a temporary file, which is repeated until the RIP collects and completes the flattening process for all the objects in a page. Such conventional approaches result in a loss of perceptual quality in the rendered job and increased memory requirements, thereby causing a loss in productivity during the processing of an RIP job.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved method, system, and computer program product for improve raster image processing operations.

It is another aspect of the disclosed embodiments to provide for RIP performance improvement by pre-flattening complicatedly designed backgrounds with multiple objects of significantly low relative occupancy.

It is yet another aspect of the disclosed embodiments to enhance the performance of a raster image processor by reducing computer memory requirements during raster image processing.

The aforementioned aspects and other objectives and advantages can now be achieved as described herein. Methods, systems and computer program products are disclosed herein for improving the performance of a raster image processor. Smaller objects are identified among a group of larger objects with respect to a job processed via a raster image processor. The smaller objects are merged with one or more larger objects among the group of larger objects. The smaller objects that are merged with the larger object are treated as a single object without losing the perceptual quality of the job and while reducing memory requirements to thereby enhance productivity during processing of the job via the raster image processor. The smaller object can be pre-flattened and the larger object(s) flattened. The larger object generally constitutes a background object.

Additionally, a collection of the smaller objects merged with the larger object(s) can be updated. The pre-flattened object can be compressed using an image compression method, which can be then decompressed. The job can then be rendered after decompressing the compressed data.

Each object among the smaller objects possesses a size of less than m×n where m is a value between 1 and 8 and n is a value between 1 and 8. Each object does not overlap with other objects. Each can be located in the second lowest layer or an immediate upper layer. The background object possesses a size that is equal or greater than a size of the smaller objects and wherein the background object entirely covers the smaller objects.

The disclosed approach thus identifies the tiny objects used to improve the design of the background (which is not necessarily intended to be imaged separately). Next, the identified tiny objects are pre-flattened and the background (e.g., image) is flattened with the tiny vectors and considered and collected as a single object. This approach can improve the performance of the system to a great extent, while ensuring the removal of unwanted JPEG ghosting effects.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having". "has", "with", or variants thereof are used in either the detailed description and the claims, such terms are intended to be inclusive in a manner similar to the term "comprising." The term "at least one of" is used to mean one or more of the listed items can be selected.

Figure 1:
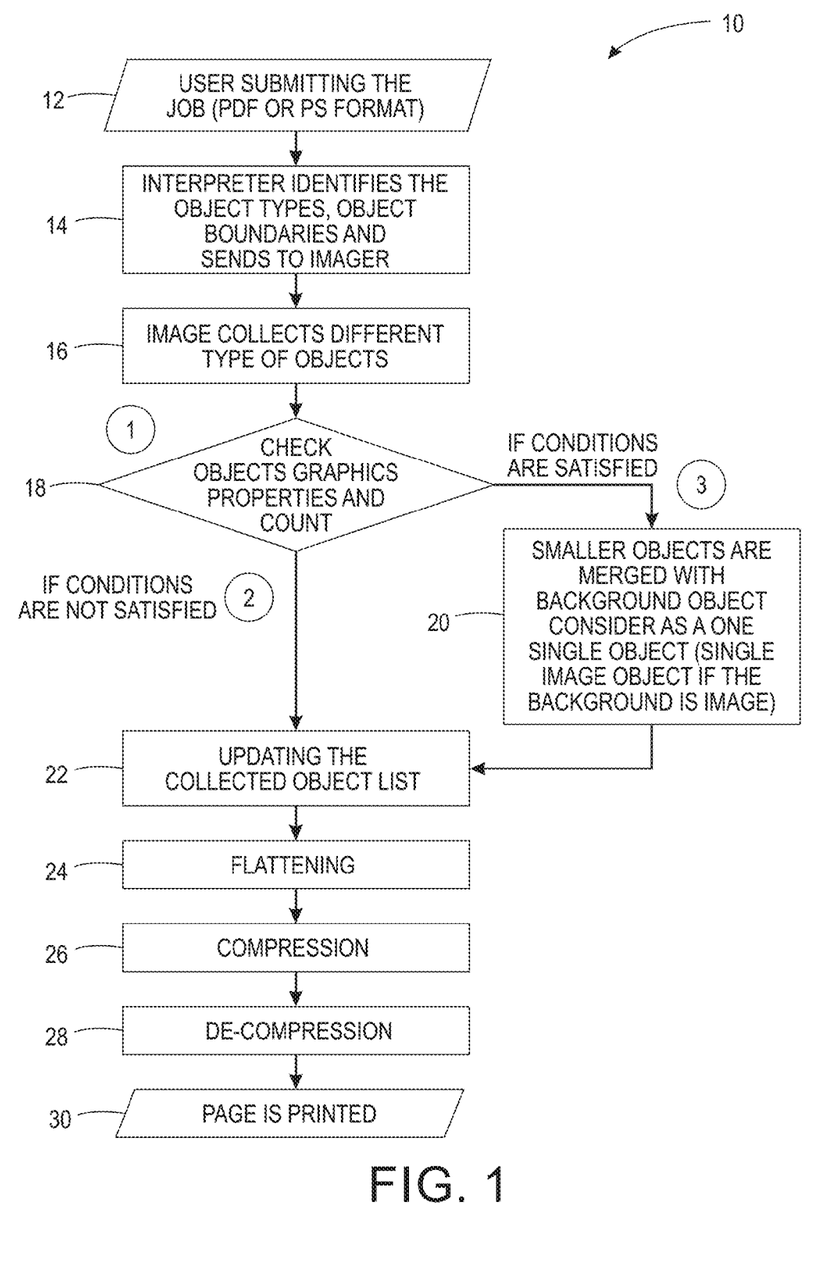
FIG. 1 illustrates a flow chart of operations depicting logical operational steps of a method for improving RIP performance, in accordance with a preferred embodiment.

FIG. 1 illustrates a flow chart of operations depicting logical operational steps of a method 10 for improving RIP performance, in accordance with a preferred embodiment.

As indicated at block 12, a step or operation can be implemented in which a user submits a job (e.g., PDF, PS format, etc.). Thereafter, as shown at block 14, an interpreter identifies object types, object boundaries and sends this information to the image. An example of such an interpreter is the interpreter 82 shown in FIG. 6. Then, as shown at block 16, a step or operation can be implemented in which an imager collects different types of objects. An example of such an imager is the imager 84 also depicted in FIG. 6.

Following processing of the operation depicted at block 16, a step or operation can be implemented, as shown at decision block 18 to check graphical properties of the objects and then perform a count operation. If the conditions are satisfied, then as shown at block 20, an operation can be implemented in which smaller objects are merged with the background object and considered as a single object (e.g., a single image object if the background is an image). If the conditions are not satisfied (in response to the operation shown at decision block 18), then as indicated at block 22, an operation can be implemented to update the collected object list (i.e., collected data).

Thereafter, a flattening operation can be processed, as shown at block 24 followed by an operation to compress the collected data as depicted at block 26. A de-compression operation can be then implemented as shown at block 28 followed by rendering (e.g., printing) of the page, as shown at block 30. In other words, the collection of the smaller objects merged with the larger object(s) can be updated. The pre-flattened object can be then compressed using an image compression module, which can be then decompressed. The job can then be rendered after decompressing the compressed data.

Figure 2:
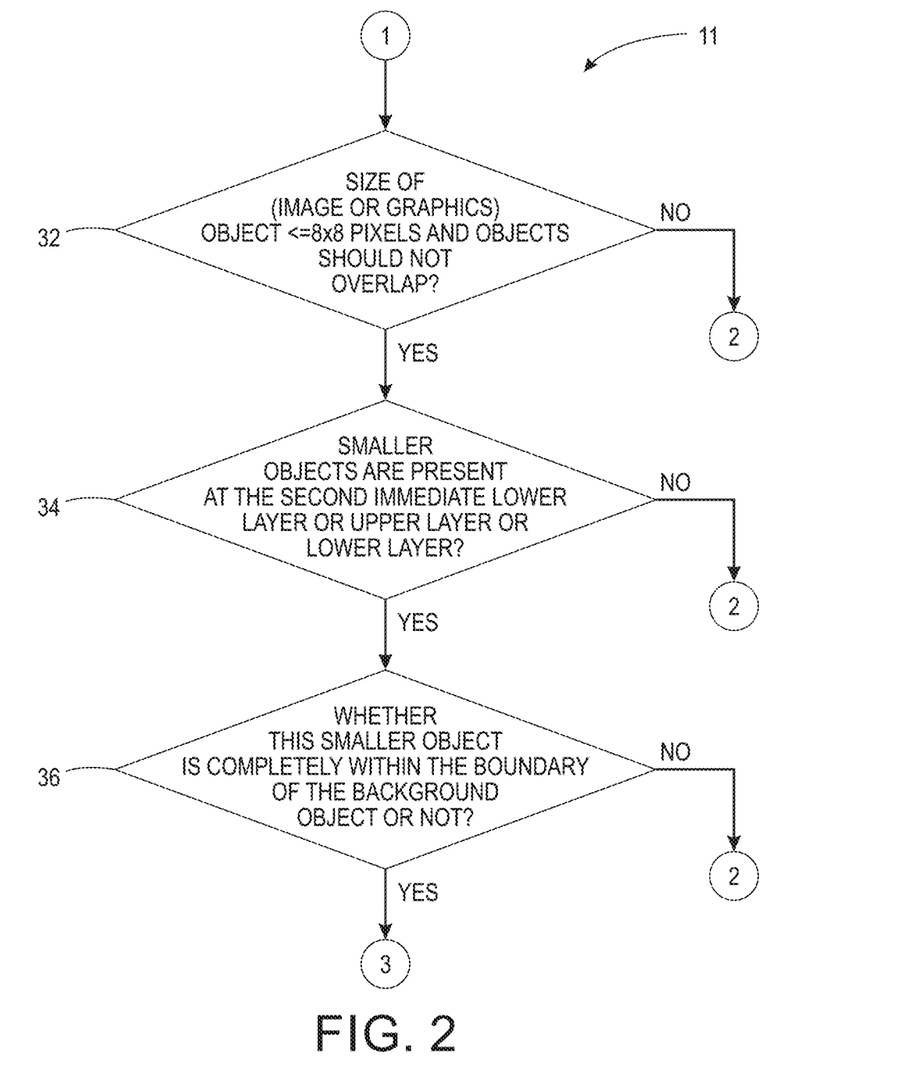
FIG. 2 illustrates a flow chart of operations depicting continued operational steps of a method for improving RIP performance, in accordance with a preferred embodiment.

FIG. 2 illustrates a flow chart of operations depicting continued operational steps of a method 11 for improving RIP performance, in accordance with a preferred embodiment. Note that the method 11 can be implemented in the context of the method 10 shown in FIG. 1. The operations shown in FIG. 2 can be implemented specifically with respect to the operation associated with circle 1 in FIG. 1. That is, circle 1 shown in FIG. 1 is associated with the operations of decision block 18. Thus, the operations of blocks 32, 34 and 36 of FIG. 1 can implement a count operation. Recall that decision block 18 includes a "count" aspect. The operations shown in FIG. 2 can thus implement the "count" portion of the operation described at block 18 of FIG. 1.

As shown at decision block 32 in FIG. 2, a step or operation can be implemented to determine if the size of the object (image or graphics) is less than or equal to 8×8 pixels and if the objects overlap. If not, then the operations following circle 2 shown in FIG. 1 can be implemented. That is, the operations shown in blocks 22, 24, 26, 28 and 30 can be implemented.

Assuming that the answer with respect to the test performed as shown at block 32 is "Yes" then the operation indicated at decision block 34 can implemented. That is, a test can be performed, as shown at block 34, to determine if the smaller objects are present at the second immediate lower layer or the upper layer or the lower layer. If not, then the operations with respect to circle 2 of FIG. 1 are processed (i.e., blocks 22, 24, 26, 28, 30).

If the answer is "Yes" with respect to the operation shown at block 34, then as indicated at decision block 36, a test can be performed to determine if the smaller object is completely within the boundary of the background object. If so, then the operations with respect to circle 3 shown in FIG. 1 are processed (e.g., the operations depicted at block 20 and so on). If the answer with respect to decision block 36 is "no" then the operations with respect to circle 2 of FIG. 1 are implemented as described previously.

There are thus two scenarios in which the disclosed approach can effectively improve system performance. The first case involves non-overlapped small objects replicated over a larger or "big" object. Regarding the "smaller objects," the size of this object should be less than [m×n] where m is 1-8, n is 1-8 (i.e., the value 8 is selected because JPEG compression functions on 8×8 blocks). The smaller object(s) should not overlap with other objects and should be located in second lowest layer (a layer just above the lowest/bottom layer) or immediate upper layer. Regarding "big" or background objects, the size of the object should be equal/more than the smaller objects boundary region and should entirely cover the smaller objects.

This process flow is thus shown in FIGS. 1-2, which can be summarized as follows. The user subjects the job (e.g., PDF or PS formats). An interpreter begins to identify the object(s) and sends it to the imager for flattening. The object(s) will then be subject to an object count algorithm (e.g., as shown in FIG. 2), wherein determinations are made regarding the size of (image or Graphics) the object being <=8 pixels and determine if such objects overlap one another. Smaller objects should be present at the second immediate lower layer or upper layer. A determination can also be made whether this smaller object is completely within the boundary of the object beneath. A pre-flattening module will be executed, if all the above conditions are satisfied. The pre-flattening module will merge smaller objects with the background object and create a single image object and then flatten it like a single object. Flattening of all objects will take place after pre-flattening as usual.

Figure 3:
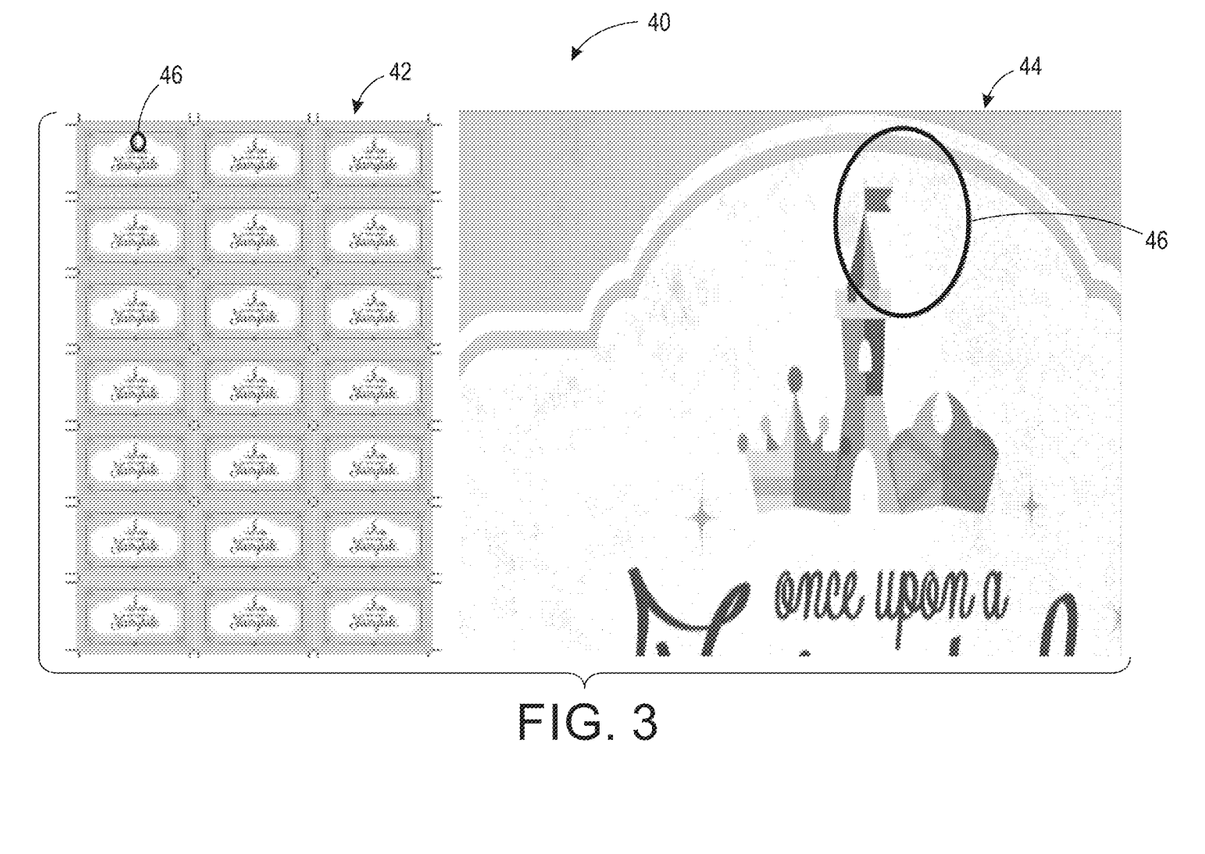
FIG. 3 illustrates an image of a job processed via an RIP, in accordance with an alternative embodiment.

FIG. 3 illustrates an image of an example job 40 processed via an RIP, in accordance with an alternative embodiment. In the example shown in FIG. 3, the job 40 can be composed of an image sheet 42 that includes multiple identical sub-images such as the sub-image 44 shown to the left of the image sheet 42. Small objects are shown within, for example, the circle 46 depicted in FIG. 3. The sub-image 44 is shown in FIG. 3 to the right of the image sheet 42.

Figure 4:
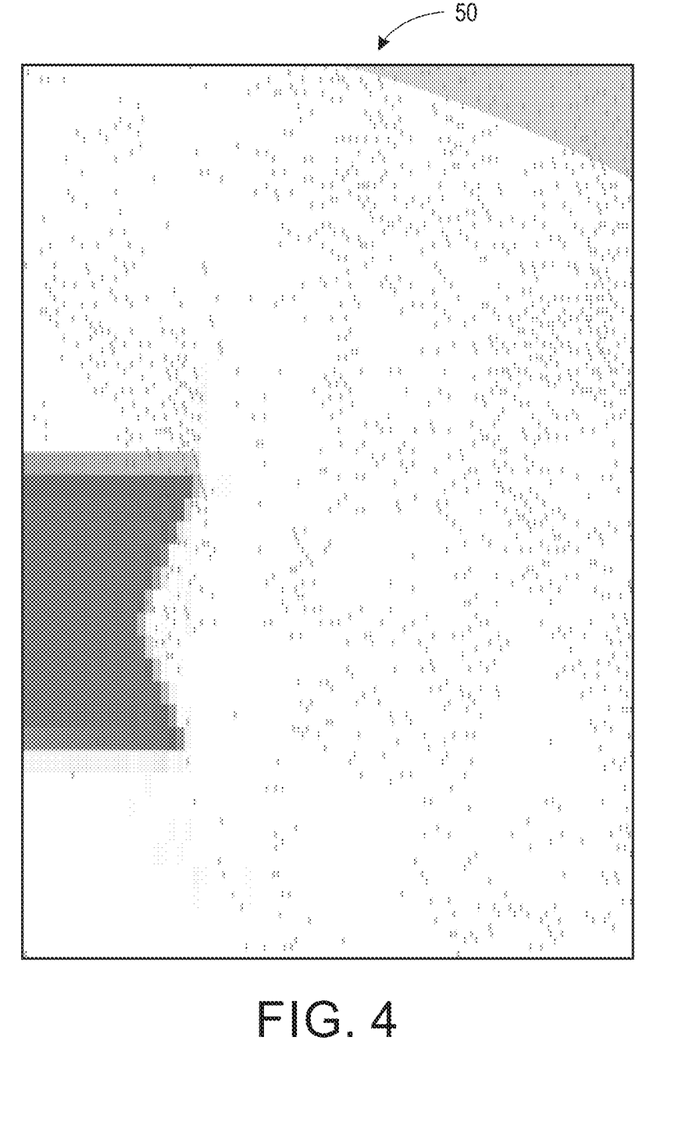
FIG. 4 illustrates an image of a job wherein a small object is perceptually replicated across lower layers of the job, in accordance with an alternative embodiment.

FIG. 4 illustrates an image of a job 50 wherein a small object is perceptually replicated across lower layers of the job 50, in accordance with an alternative embodiment. As indicated previously, the size of the smaller object should be less than [m×n] where m is 1-8, n is 1-8. The smaller object should not overlap with one another and with other objects and additionally should be located in the lowest layer of the job.

An example scenario is as follows. A user submits a job (e.g., PDF or PS or TIFF or supported formats). The interpreter begins to identify objects and initiates the process of sending the object(s) to the image. The objects are then processed through the object count algorithm or process as shown in FIG. 2. In this particular case, the size of the object (image or graphics) is <=8 pixels and should not overlap with others. Smaller object(s) are present in the lowest layer of the job. If all the above conditions are satisfied, then pre-flattening operations (e.g., a pre-flattening module) will be executed. The pre-flattening module merges the smaller objects as one because in this process all such objects are considered to be a single object and are thus flattened as a single object. The pre-Flattened single object can be saved in an image buffer (or buffers). Finally, flattening of all objects can take place.

Figure 5:
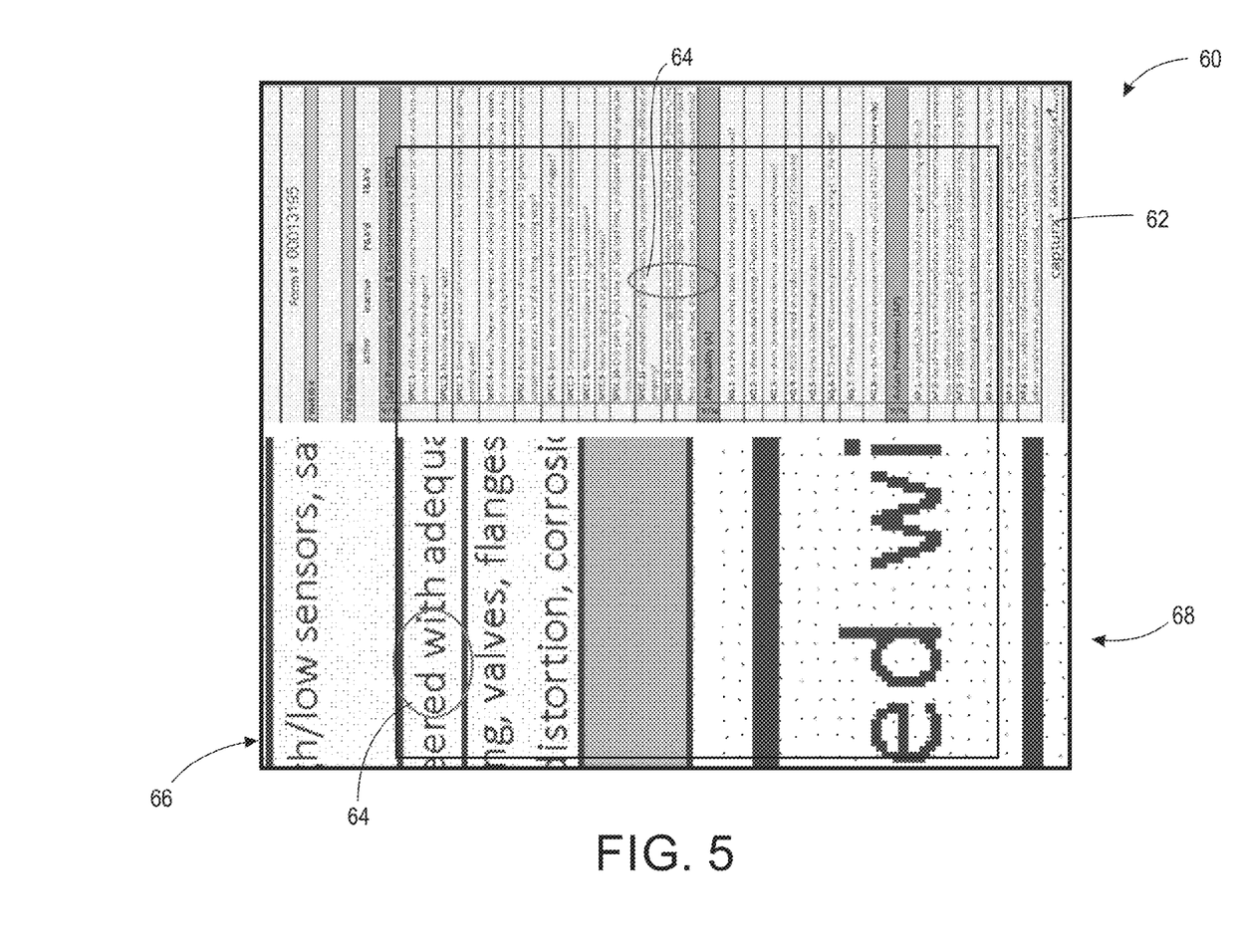
FIG. 5 illustrates an example job which can be implemented in accordance with an alternative embodiment.

FIG. 5 illustrates an example job 60 which can be implemented in accordance with an alternative embodiment. In FIG. 5, the area shown in circle 64 with respect to image 62 is shown with increasing granularity in image 64 and then in image 68. Small objects are depicted within the area encompassed by circle 64. Thus, the approach described herein can be employed to identify tiny objects used in improving the design of a background (and not necessarily intended to be imaged separately). The identified tiny objects can be pre-flattened and the background (e.g., image) flattened with the tiny vectors and considered and collected together as a single object. This approach will improve the performance of the system to a great extent. Additionally, this approach can ensure removing unwanted JPEG ghosting effect, which, necessarily, is an effect of compression switching between or in the context of an 8×8 block.

Figure 6:
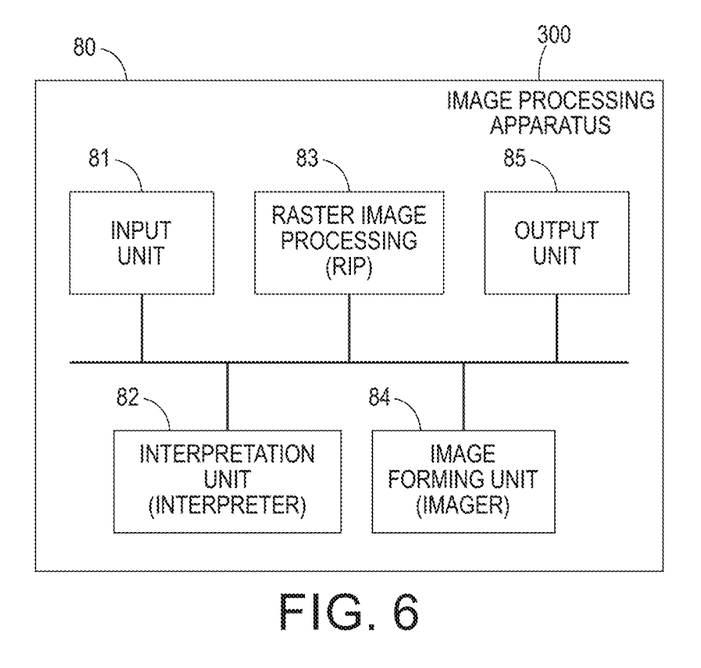
FIG. 6 illustrates a block diagram illustrating various functions of an example raster image processing (RIP) unit, which can be implemented in accordance with an alternative embodiment.

FIG. 6 illustrates a block diagram illustrating various functions of an image processing apparatus 80 that includes an RIP 83, in accordance with an alternative embodiment. The image processing apparatus 80 generally includes an input unit 81, an RIP (Raster Image Processor) 83, an output unit 85, an interpreter 82 (also referred to as an "interpretation unit") and an image 84 (also referred to as an "image forming unit"). The image processing apparatus 80 can thus generate raster image data by generating intermediate data based on, for example, input PDL data and then rendering the intermediate data.

In an exemplary embodiment, the term object can refer to an element constituted by, for example, an input command. For example, objects can include as their types bitmap graphics, flat graphics, gradation graphics, text and so on. A raster image refers to an object classified into bitmap graphics including, for example, photograph data, for example, bitmap (BMP) and a joint photographic expert group (JPEG). The raster image can undergo an image region determination process or an image region segmentation process, so that the raster image is determined and segmented as at least one of the image regions of a flat fill portion (single color data portion) and a bitmap portion. In one embodiment, input PDL data can undergo a series of image processes including an intermediate data generation process, an intermediate data holding process, and an intermediate data rendering process, so that raster image data is generated.

In the example shown in FIG. 6, the image processing apparatus 80 can form an image based on a command, and then outputs the image. In some situations the input unit 81 may receive a command from, for example, an external device connected to the image processing apparatus 80. The external device may include a data processing device and a server, which can communicate through a bidirectional communicable interface. For example, the bidirectional communicable interface may be a universal serial bus (USB) interface and a network interface. The server, for example, can be arranged in the context of a web server environment.

The interpreter 82 interprets the drawing command received by the input unit 81. In one example, the command may be implemented in a PDL format. In a preferred embodiment, the interpreter 82 identifies objects and sends the objects to the imager 84 for flattening. The RIP 83 generates a raster image by performing rendering based on the command interpreted by the interpreter 82. The imager 84 performs an image process such as, for example, a halftone process, on the raster image generated by the RIP 83, thereby forming an output image. The output unit 85 outputs the output image formed by the image-forming unit 84. In one example embodiment, the image processing apparatus 80 can be provided as a multi-function printer (MFP), and the output unit 85 outputs the output image by printing the output image on a recording sheet.

Figure 7:
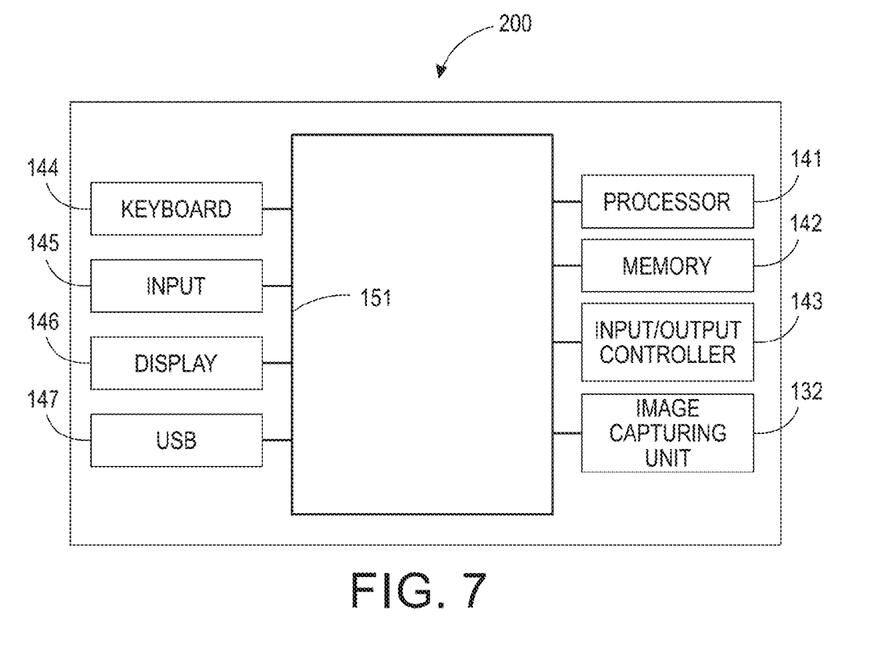
FIG. 7 illustrates a schematic view of a computer system, in accordance with an embodiment.

The interpreter 82, the RIP 83, and the image-forming unit 84 perform the respective processes by a central processing unit (CPU) executing various types of programs loaded to a random access memory (RAM). The raster image-processing unit 83 may perform the process by an application specific integrated circuit (ASIC) for generating a raster image, instead of a CPU. Note that an example of a CPU is the processor 141 shown in FIG. 7. An example of a RAM is, for example, memory 142, which is also depicted in FIG. 7.

As can be appreciated by one skilled in the art, embodiments can be implemented in the context of a method, data processing system, or computer program product. Accordingly, embodiments may take the form of an entirely hardware embodiment, an entirely software embodiment or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi. Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
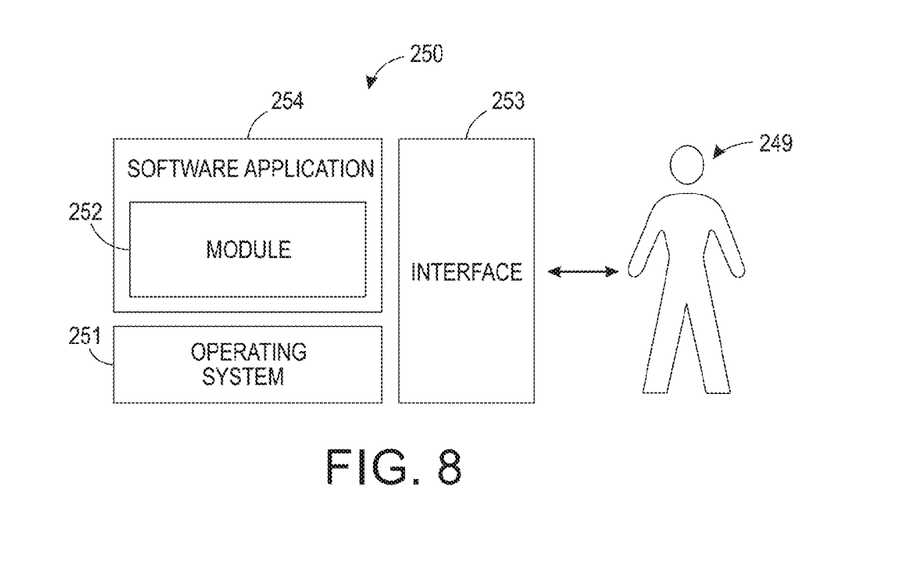
FIG. 8 illustrates a schematic view of a software system including a module, an operating system, and a user interface, in accordance with an embodiment.

FIGS. 7-8 are provided as exemplary diagrams of data-processing environments in which embodiments of the present invention may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system 200 that includes, for example, a processor 141 such as a CPU, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc. It can be appreciated that some of the components shown in FIG. 7 are optional and desirable only in certain situations. For example, the image-capturing unit 132 may or not be included with data-processing system 200 but may be desirable in the case of, for example, Smartphone or laptop computer implementations, which often include a video camera.

FIG. 8 illustrates a computer software system 250 for directing the operation of the data-processing system 200 depicted in FIG. 7. Software application 254, stored for example in memory 142, generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module 252 that can implement instructions or logical operations such as those shown in, for example, and described herein with respect to FIGS. 1-2.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

The module 252 shown in FIG. 8 can thus implement instructions such as those shown and described and illustrated herein with respect to, for example, blocks 12, 14, 16, 18, 20, 22, 24, 26, 28, 30 of FIG. 1 and blocks 32, 34, 36 of FIG. 2. It can be appreciated, however, that such blocks/operations shown in FIGS. 1-2 are not limiting features of the disclosed embodiments. Other operations can be implemented with or in lieu of such instructions/operations.

FIGS. 7-8 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of embodiments, preferred and alternative, are disclosed herein. In a preferred embodiment, a method is disclosed for improving the performance of a raster image processor. Such a method can include steps or logical operations of, for example: identifying smaller objects among a group of larger objects with respect to a job processed via a raster image processor; merging the smaller objects with at least one larger object among the group of larger objects; and treating the smaller objects merged with the larger object(s) as a single object without losing the perceptual quality of the job and while reducing memory requirements to thereby enhance productivity during processing of the job via the raster image processor.

In another embodiment, the step or logical operation of merging the smaller objects with the larger object(s) includes a step or logical operation for pre-flattening the smaller object and flattening the larger object(s). The larger object(s) can include a background object. In yet another embodiment, a step or logical operation can be implemented for updating a collection of the smaller objects merged with the larger object(s). In still another embodiment, steps or logical operations can be provided for compressing into compressed data the collection of the smaller objects merged with the larger object(s); and thereafter decompressing the compressed data. In still another embodiment, a step or logical operation can be provided for rendering the job after decompressing the compressed data.

In yet another embodiment, each object among the smaller objects can possess a size of less than m×n where m is a value between 1 and 8 and n is a value between 1 and 8. Each object should not overlap with other objects and wherein each object is located in a second lowest layer or an immediate upper layer. In still another embodiment, the background object possesses a size that is equal or greater than a size of the smaller objects and wherein the background object entirely covers the smaller objects.

In another embodiment, a system can be provided for improving the performance of a raster image processor. Such a system can include, for example, at least one processor and a computer-usable medium embodying computer program. The computer-usable medium is capable of communicating with the processor(s), the computer program code comprising instructions executable by the processor(s) and configured, for example, for: identifying smaller objects among a group of larger objects with respect to a job processed via a raster image processor; merging the smaller objects with at least one larger object among the group of larger objects; and treating the smaller objects merged with the larger object(s) as a single object without losing the perceptual quality of the job and while reducing memory requirements to thereby enhance productivity during processing of the job via the raster image processor.

In another embodiment, the aforementioned instructions for merging the smaller objects with the larger object(s) can further involve instructions configured for pre-flattening the smaller object and flattening the larger object(s). In some system embodiments, the larger object(s) comprises a background object. In other system embodiments, the aforementioned instructions can be further configured for updating a collection of the smaller objects merged with the larger object(s).

In still another system embodiment, the aforementioned instructions can be further configured for compressing into compressed data the collection of the smaller objects merged with the larger object(s); and thereafter decompressing the compressed data. In still other embodiments, the aforementioned instructions can be further configured for rendering the job after decompressing the compressed data. In yet another system embodiment, each object among the smaller objects possesses a size of less than m×n where m is a value between 1 and 8 and n is a value between 1 and 8. In another system embodiment, each object does not overlap with other objects and each of the objects is located in a second lowest layer or an immediate upper layer. In yet another system embodiment, the background object possesses a size that is equal or greater than a size of the smaller objects and wherein the background object entirely covers the smaller objects.

In still another embodiment, a computer program product can be implemented, which includes a non-transitory computer-readable storage medium with computer-executable instructions stored thereon, the computer-executable instructions causing a computer to perform: identifying smaller objects among a group of larger objects with respect to a job processed via a raster image processor; merging the smaller objects with at least one larger object among the group of larger objects; and treating the smaller objects merged with the larger object(s) as a single object without losing the perceptual quality of the job and while reducing memory requirements to thereby enhance productivity during processing of the job via the raster image processor. The computer-executable instructions can further include computer-executable instructions for pre-flattening the smaller object and flattening the larger object(s) and wherein the larger object(s) comprises a background object.

It will be appreciated that variations of the above-disclosed and other features and functions, or alternatives thereof, may be desirably combined into many other different systems or applications. It can also be appreciated that various presently unforeseen or unanticipated alternatives, modifications, variations or improvements therein may be subsequently made by those skilled in the art which are also intended to be encompassed by the following claims.

The invention claimed is:

1. A method for improving the performance of a raster image processor, said method comprising:
   identifying smaller objects among a group of larger objects with respect to a job processed via a raster image processor;
   merging said smaller objects with at least one larger object among said group of larger objects after said identifying said smaller objects among said group of larger objects;
   treating said smaller objects merged with said at least one larger object as a single object without losing the perceptual quality of said job and while simultaneously reducing memory requirements to thereby enhance productivity during processing of said job via said raster image processor; and
   thereafter rendering said job with a rendering device associated with said raster image processor wherein said background object possesses a size that is equal or greater than a size of said smaller objects and wherein a background object entirely covers said smaller objects.

2. The method of claim 1 wherein said merging said smaller objects with said at least one larger object comprises pre-flattening said smaller object and flattening said at least one larger object.

3. The method of claim 2 wherein said at least one larger object comprises said background object.

4. The method of claim 2 further comprising updating a collection of said smaller objects merged with said at least one larger object.

5. The method of claim 4 further comprising:
   compressing into compressed data said collection of said smaller objects merged with said at least one larger object; and
   thereafter decompressing said compressed data prior to said rendering.

6. The method of claim 5 further comprising rendering said job with said rendering device after decompressing said compressed data and prior to said rendering.

7. The method of claim 2 wherein each object among said smaller objects possesses a size of less than m×n where m is a value between 1 and 8 and n is a value between 1 and 8.

8. The method of claim 7 wherein said each object does not overlap with other objects and wherein said each object is located in a second lowest layer or an immediate upper layer.

9. A system for improving the performance of a raster image processor, said system comprising:
   at least one processor that operably communicates with a rendering device; and
   a non-transitory computer-usable medium embodying computer program code, said computer-usable medium capable of communicating with said at least one processor, said computer program code comprising instructions executable by said at least one processor and configured for:
   identifying smaller objects among a group of larger objects with respect to a job processed via a raster image processor;
   merging said smaller objects with at least one larger object among said group of larger objects after said identifying said smaller objects among said group of larger objects;
   treating said smaller objects merged with said at least one larger object as a single object without losing the perceptual quality of said job and while simultaneously reducing memory requirements to thereby enhance productivity during processing of said job via said raster image processor;
   rendering said job with said rendering device associated with said raster image processor;
   compressing into compressed data said collection of said smaller objects merged with said at least one larger object; and
   decompressing said compressed data, wherein said instructions for merging said smaller objects with said at least one larger object further comprises instructions configured for pre-flattening said smaller object and flattening said at least one lager object, wherein said at least one lager object comprises a background object, wherein said instructions are further configured for updating a collection of said smaller objects merged with said at least one lager object and wherein each object among said smaller objects possesses a size of less than m×n where m is a value between 1 and 8 and n is a value between 1 and 8.

10. The system of claim 9 wherein said instructions are further configured for rendering said job with said rendering device after decompressing said compressed data.

11. The system of claim 9 wherein said each object does not overlap with other objects and wherein said each object is located in a second lowest layer or an immediate upper layer.

12. The system of claim 11 wherein said background object possesses a size that is equal to or greater than a size of said smaller objects and wherein said background object entirely covers said smaller objects.

13. A computer program product comprising a non-transitory computer-readable storage medium with computer-executable instructions stored thereon, said computer-executable instructions causing a computer to perform operations comprising:
   identifying smaller objects among a group of larger objects with respect to a job processed via a raster image processor;
   merging said smaller objects with at least one larger object among said group of larger objects after said identifying said smaller objects among said group of larger objects;
   treating said smaller objects merged with said at least one larger object as a single object without losing the perceptual quality of said job and while reducing memory requirements to thereby enhance productivity during processing of said job via said raster image processor; and
   thereafter rendering said job with a rendering device associated with said raster image processor wherein a background object possesses a size that is equal or greater than a size of said smaller objects and wherein said background object entirely covers said smaller objects.

14. The computer program product of claim 13 wherein said computer-executable instructions further comprise pre-flattening said smaller object and flattening said at least one larger object and wherein said at least one larger object comprises said background object.

* * * * *